Figure 1:
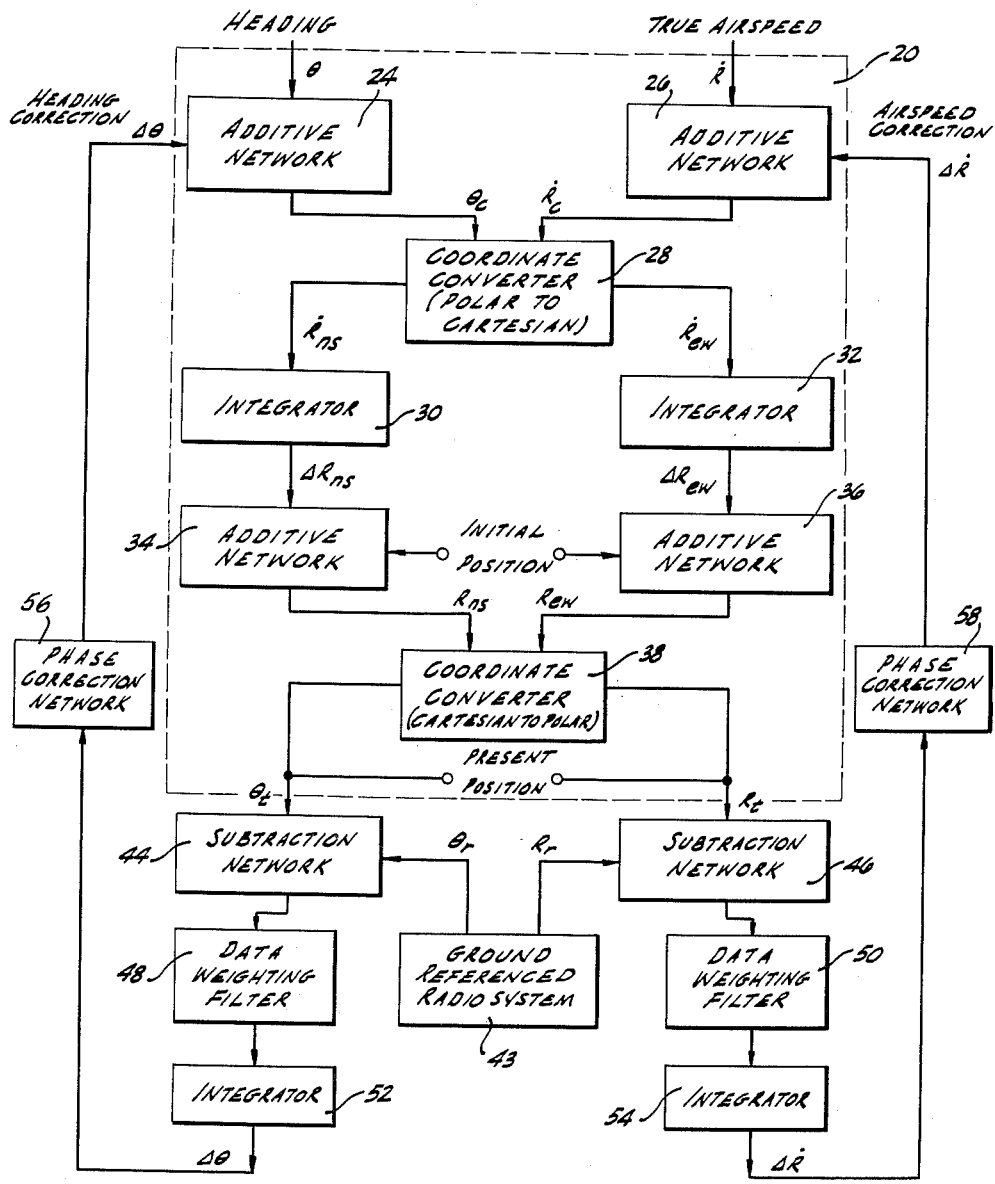

Jan. 23, 1962        D. J. GREEN        3,018,049
PROBABILITY CURVE AND ERROR LIMIT COMPUTER
Filed April 3, 1956        3 Sheets-Sheet 1

INVENTOR.
DAVID J. GREEN,
BY Perry E. Turner
AGENT.

Jan. 23, 1962  D. J. GREEN  3,018,049
PROBABILITY CURVE AND ERROR LIMIT COMPUTER
Filed April 3, 1956   3 Sheets-Sheet 2

INVENTOR,
DAVID J. GREEN,
BY Perry E. Turner
AGENT.

Jan. 23, 1962   D. J. GREEN   3,018,049
PROBABILITY CURVE AND ERROR LIMIT COMPUTER
Filed April 3, 1956   3 Sheets-Sheet 3

INVENTOR.
DAVID J. GREEN,
BY
Perry E. Turner
AGENT.

United States Patent Office 3,018,049
Patented Jan. 23, 1962

3,018,049
PROBABILITY CURVE AND ERROR
LIMIT COMPUTER
David J. Green, Pacific Palisades, Calif., assignor to Lear, Incorporated, Santa Monica, Calif.
Filed Apr. 3, 1956, Ser. No. 575,869
2 Claims. (Cl. 235—184)

This invention relates generally to the navigation of vehicles, and more particularly to a novel aircraft navigation system for interconnecting self-contained and externally-referenced position indicating systems to obtain accurate information on the instantaneous position of the aircraft.

Self-contained navigation systems measure the velocity vector of an aircraft in space by means of suitable transducers, from which position with respect to ground is determined. Externally-referenced systems, which are mainly ground-referenced radio-type systems, measure position relative to a reference site directly. Both classes of equipment are often carried in modern aircraft, and depending upon circumstances during flight, one or the other of the two systems is relied on for position information. However, inherent limitations in the respective systems cause errors to be present in data from each system. In particular, the main weakness of practical self-contained systems is loss of accuracy with time. Radio ground-referenced systems suffer from line-of-sight and terrain-dependent limitations, and they are susceptible to jamming and adverse signal-to-noise conditions. In attempting to minimize the deficiencies of either system, the usual practice is to resort to highly complex arrangements which add considerably to the cost, size and weight of the system. Furthermore, regardless of how elaborate are the refinements made in the individual systems, the two sets of data will still differ because the two systems have their own characteristic limitations. This means that regardless of which system is relied on at any time for position information, completely reliable information about the instantaneous position of the aircraft cannot be assured.

It is a primary object of this invention to provide, for two navigation systems which purportedly give the same position information, a self-correcting system which automatically correlates their data to develop data on the instantaneous position of an aircraft which is more accurate and reliable than the position information supplied by either navigation system alone.

It is another object of this invention to provide automatic self-correcting navigation with two existing navigation systems which provide different sets of data having respective inaccuracies, wherein the deficiencies of the systems are minimized to provide accurate, reliable data on the present position of the aircraft.

It is another object of this invention to provide a system for obtaining accurate information on the present position of an aircraft with two basic navigation systems, without resort to complex additional equipment of prohibitive size, cost and weight.

Still another object of this invention is to provide novel means to automatically correct data from two types of navigation systems, which comprise a minimum number of component parts of simple design, and which provides more reliable and current information on aircraft position than elaborate and complex systems of the prior art.

Figure 4:
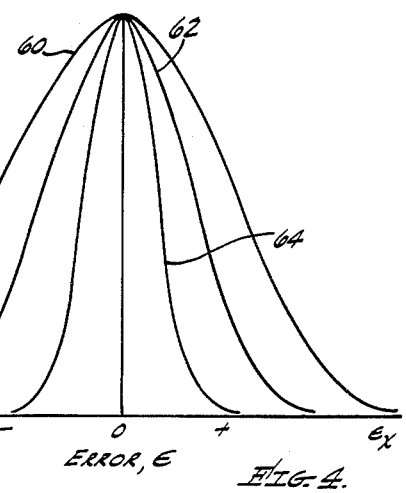
Figure 5:
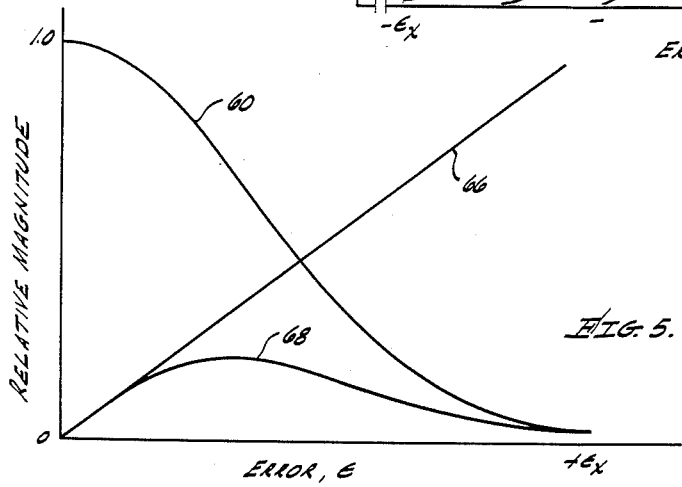
Figure 6:
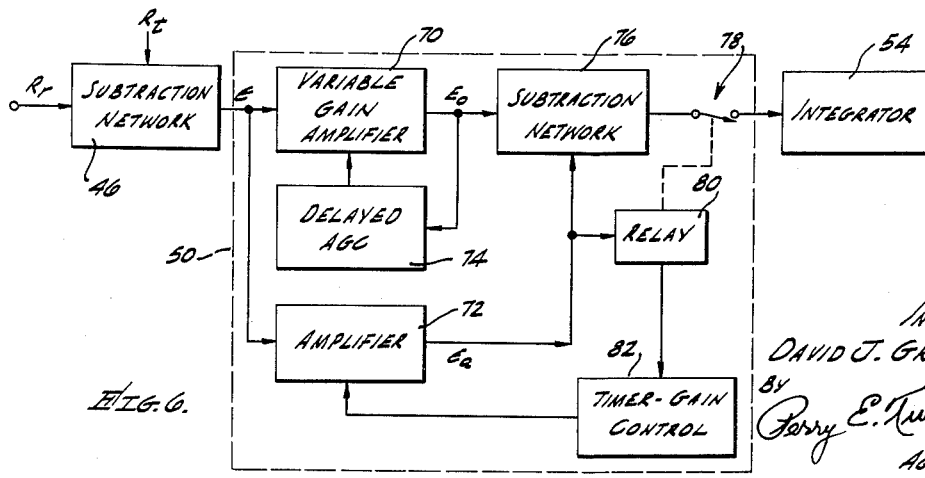
Figure 7:
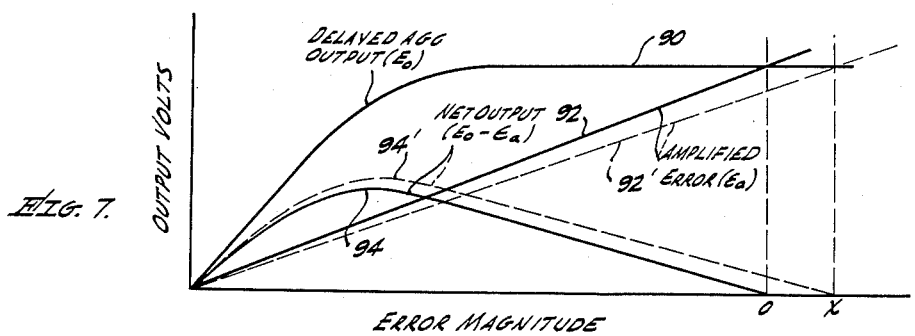
Figure 8:
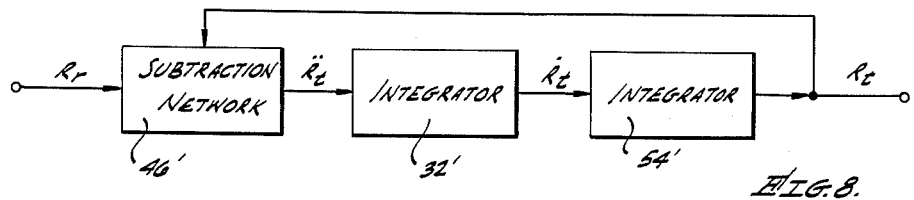
Figure 9:
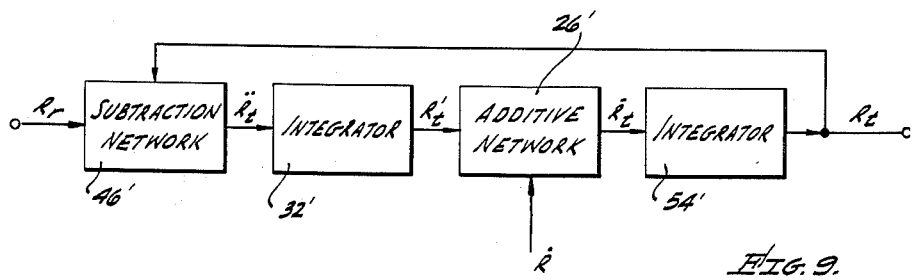
Figure 10:
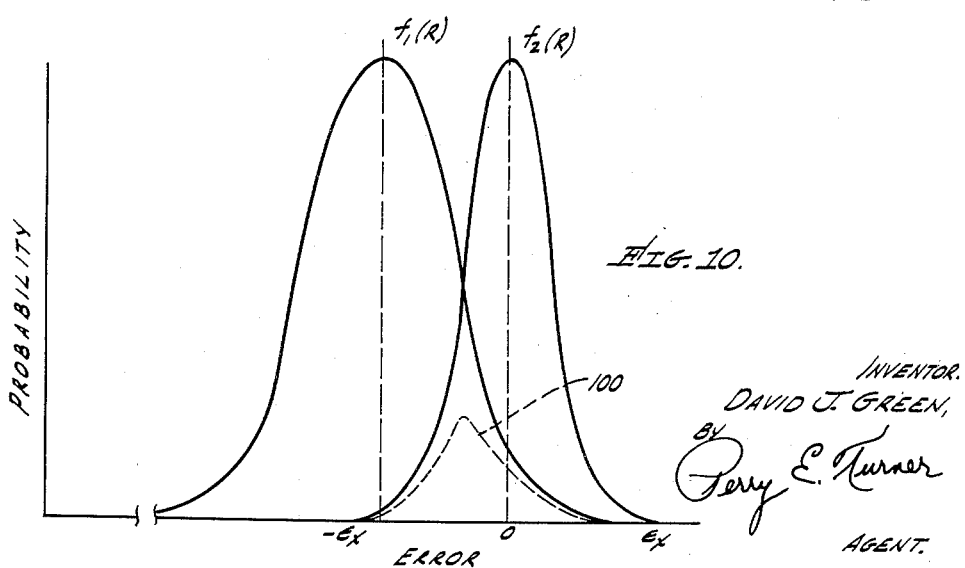

The above and other objects and advantages of this invention will become apparent from the following description taken in conjunction with the accompanying drawings, in which an embodiment of the invention is illustrated by way of example. The scope of the invention is pointed out in the appended claims. In the drawings, FIG. 1 is a block diagram of a self-correcting automatic navigation system, in accordance with this invention, FIGS. 2–5 are curves illustrating statistical processes to aid in understanding the operation of the system of FIG. 1, FIG. 6 is a detailed block diagram of a portion of the system of FIG. 1, FIG. 7 illustrates curves to aid in explaining the operation of the portion of the system shown in FIG. 6, FIGS. 8 and 9 are simplified block diagrams to aid in explaining the operation of the system of FIG. 1, and FIG. 10 illustrates curves to further aid in explaining the operation of the system of FIG. 1.

Briefly, in accordance with this invention, position information from a self-contained system is combined with position indicating data from a ground-referenced radio system. The two systems are interconnected by means for establishing confidence limits for radio data which will be accepted by the self-contained system, and the radio data is weighted with respect to the information from the self-contained system to arrive at a joint result which is the product of the probability error distributions of the respective sets of data.

This invention will be described in connection with a self-contained navigation system of the type known as a dead-reckoner and an externally-referenced navigation system of the radio type. It will become apparent from the following description, however, that this invention embraces combinations of any other types of self-contained and externally-referenced navigation systems.

Referring to FIG. 1, a dead reckoning system 20 of the true-airspeed and heading type is supplied with respective heading and airspeed signal indications $\theta$ and $\dot{R}$, as by means of conventional transducers (not shown), which represent the velocity vector of the aircraft in space. These signal indications $\theta$, $\dot{R}$ are applied to respective additive networks 24, 26 where corrections to these data are to be added for the usual purpose, i.e., to make them represent ground track $\theta_c$ and ground speed $\dot{R}_c$. These data, which represent the aircraft's velocity vector relative to the ground, are applied to a coordinate converter 28 for transposing input information in polar coordinate form to Cartesian coordinate form. Two integrators 30, 32 are coupled to respective outputs of converter 28, and additive networks 34 and 36 are connected between the respective integrators 30, 32 and a coordinate converter 38 which transposes data from Cartesian to polar form.

The additive networks, integrators and coordinate converters above described may be any of several conventional types, either electrical or electromechanical. For the purposes of this description, it will be assumed that electro-mechanical arrangements (e.g., synchros) are employed wherein the positions of a mechanical device (e.g., a shaft) are reflected in signals of magnitude and a sense corresponding to the direction and amount of movement of such device.

As conventionally practiced, respective heading and airspeed correction signals are applied to additive networks 24, 26 as by manually operating a mechanical imput device (not shown) in accordance with the desired corrections to be made; for this purpose, conventional practice may be followed wherein the position of a synchro shaft or housing is controlled from a calibrated knob. The modified signals $\theta_c$ and $\dot{R}_c$ appear in the outputs of additive networks 24, 26 in polar coordinate form. Converter 28 transposes these signals into their Cartesian coordinate form, $\dot{R}_{ns}$ and $\dot{R}_{ew}$, in which form they represent aircraft velocity components along arbitrarily chosen north-south and east-west ordinates. The time integration of these velocity signal components in integrators 30, 32 results in signals $\Delta R_{ns}$ and $\Delta R_{ew}$ representing the distance traveled.

In the additive networks 34, 36, these signals $\Delta R_{ns}$ and $\Delta R_{ew}$ are combined with signals representing the position of the aircraft at the beginning of flight, resulting in signals $R_{ns}$ and $R_{ew}$ representing the present position of the aircraft in Cartesian form. Signals representing initial position may be applied by manual control in the manner mentioned above. Coordinate converter 38 transforms these signals into their polar form $\theta_t$ and $R_t$, representing bearing and distance from the coordinate center. This coordinate center is the position of a ground-referenced system to be described hereafter. However, it will become more evident hereafter that the coordinate center can be translated to other frames of reference; such coordinate center may be the point of origin of flight, the terminal point or destination, or a geographic point designated by latitude and longitude. The coordinate center desired may be obtained in any suitable manner conventional in the art.

Disadvantages in supplying heading and airspeed corrections under manual control will be apparent. Conventionally, this is done in the initial portion of flight by utilizing locally available meteorological data to determine the magnitude and sense of correction signals to be applied to the additive networks 24, 26. These data are generally of local value and usually do not account for variations with altitude, and of course are of dubious pertinence. Thereafter, the navigator is left pretty much to his own judgment as to what the values of the correction signals should be; in this connection, his only guides are his schedule progress as determined from visual or other navigation aid, position fixes (e.g., marker beacons), or meteorological data as aforementioned, obtained from airway stations en route. Many flight paths (e.g., transoceanic or transpolar) do not offer even these opportunities.

The dead-reckoning system 20 has inherent limitations which, if left uncorrected, cause position errors to increase linearly with time. For example, if velocity relative to the air mass is measured, no accounting is made of displacement due to wind effects. If velocity with respect to ground is measured, as by well-known Doppler methods, there is no self-checking for accumulated error due to noise effects, terrain profile, or imperfections of integrators. On the other hand, where acceleration is measured by a conventional accelerometer, serious inaccuracies may result from rates of change of velocity which fall below the sensitivity threshold of the accelerometer; furthermore, considerable noise exists in the output of sensitive accelerometers on conventional aircraft which can result in erroneous integration. Since the velocity measuring systems can neither determine velocity nor integrate perfectly, and since the acceleration measuring systems can have error sources which result in the integration of incorrect velocity, continuous increase of such inaccuracies with time will occur.

Figure 2:
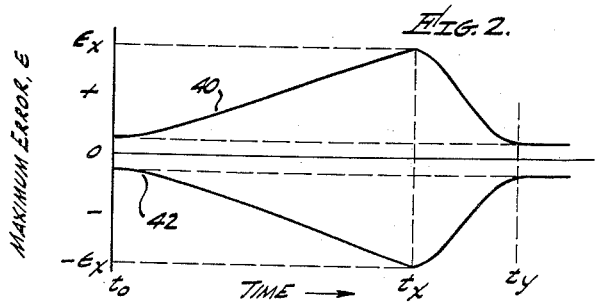

It should be noted that the sources of error above mentioned are known. Thus, for an instrumentation utilizing specific velocity or acceleration measuring devices, maximum error accumulation rates can be established. Referring to FIG. 2, correction signals continuously applied to the additive networks 24, 26 will keep the dead reckoning system operating with a minimum positional error, as represented at $t_0$. However, if correction is denied, the possible position error will increase linearly with time; curves 40, 42 represent the maximum likely error versus time relationship for instrumentation for dead reckoners. Other types of self-contained navigation systems (e.g., a Doppler-supervised ground position indicator system, or a system utilizing double integration of accelerometer measurements) will have different characteristic curves; however, it will be apparent from the following description that the system of this invention is readily operable with any self-contained system, regardless of its characteristics.

The system of this invention operates to supply the necessary heading and airspeed corrections automatically. Referring to FIG. 1, this is accomplished by interconnecting the dead-reckoning system 20 and a ground-referenced radio system 43. Ground-referenced heading and airspeed signals $\theta_r$ and $R_r$ developed by radio system 43 are applied to respective subtraction networks 44, 46, which may be of the electro-mechanical type known as a differential. For the purpose of the present explanation, radio system 43 is assumed to be of the type which utilizes rho-theta or polar coordinates, in the manner of such well-known systems as Tacan, Navarho, Omni-DME, and various radar position determining systems. Output signals from coordinate converter 38 are applied to subtraction networks 44, 46, the outputs of which are connected to data weighting filters 48, 50. Weighting filters 48, 50 are connected to respective integrators 52, 54, the outputs of which are coupled through phase correction networks 56, 58 to additive networks 24, 26.

Prior to explaining the operation of the above described inter-connecting system, brief reference will be made to the possibility of applying correction signals directly from a ground-referenced radio system. It will be recognized that in the initial portion of a flight, essentially continuous radio data would be available. Under such circumstances, correction signals $\theta$, $\dot{R}$ could readily be derived from the radio system and continuously applied to the additive networks 24, 26 to keep the dead-reckoning system 20 operating with a minimum positional error.

Radio aids intended for precision position indication must necessarily utilize short wave length radiations. It will be immediately recognized that as the flight progressed, the radio system would fail to provide reliable correction data, as the signals would suffer from the limitations inherent in such radio systems, e.g., line-of-sight limitations would restrict its use at long range and adversely effect its use at short range and low altitudes in mountainous terrain; multi-path or anomalous propagation effects would produce fixed or statistically distributed errors which vary with time of day, sun-spot activity and terrain features; it is vulnerable to intentional jamming by an enemy and to interference from transmitters erroneously tuned to the same frequency. Such effects could cause wholly false correction signals to be supplied to the dead-reckoning system, and this would result in the dead-reckoning system providing completely unreliable position information.

In the system of this invention, discernably unreliable radio data is not processed through the interconnecting system to the dead-reckoner. Referring to FIG. 2 along with FIG. 1, data weighting filters 48, 50 pass signals to the associated integrators 52, 54 only in the presence of radio signals, $\theta_r$ and $R_r$, which fall within the maximum likely positional error limits of the dead-reckoning system 20, i.e., these limits are "confidence" limits for signals to be accepted. In addition, these weighting filters, although accepting as possibly valid signals falling within the confidence limits, operate to "weight" the accepted signals and develop error signals representing the credibility thereof; how this is accomplished will be explained in detail hereafter. Integration of these error signals in integrators 52, 54 establishes heading and airspeed correction signals $\Delta \theta$, $\Delta \dot{R}$, which are applied through the respective phase correction networks 56, 58 to additive networks 24, 26, and which effect correction until $\theta_t$ and $R_t$ agree with $\theta_r$ and $R_r$, respectively. Thus, automatic self-correction of dead reckoning system 20 is realized.

Where essentially continuous radio data is available, the correction signals $\Delta \theta$, $\Delta \dot{R}$ automatically applied to the additive networks 24, 26 will keep the dead-reckoning system operating within the small positional error indicated at $t_0$ in FIG. 2, just as if such correction data was applied directly from the radio system. However, if data from radio system 43 is suddenly denied, as by reason of failure of radio system 43 or where all signals applied to data weighting filters 48, 50 fall outside the confidence limits, the dead-reckoning system will not be rendered unreliable. This is made possible by the presence in the two loops in FIG. 1 of the pairs of integrators 30—52 and 32—54. As will be made more evident hereafter, these double-integrator loops provide compound filtering of noise or random errors, and each provides velocity memory for correctly computing through intervals without radio correction data. Thus, if radio data is suddenly denied, the last correction "learned" by the system is retained. Accordingly, the dead-reckoning system 20, although its confidence limits will increase in the manner illustrated in FIG. 2, will be made unresponsive to signals of random nature which lie outside the confidence limits.

If there is an interval $t_x$ (FIG. 2) before radio data is again made available, data filters 48, 50 will accept as valid only those signals falling within the wider confidence limits $\pm \epsilon_x$. Self-correction resumes, and the progressive correction of dead-reckoning system causes it to operate with smaller and smaller positional errors until, at a time $t_y$, it is again operating with a minimum positional uncertainty.

Figure 3:
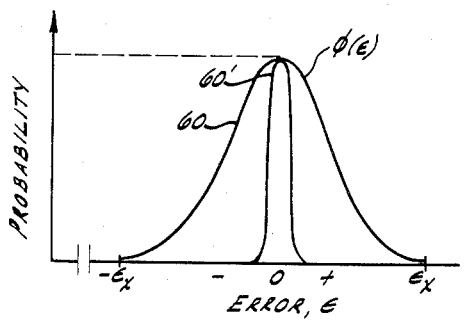

To further elaborate and explain the operations just described, reference will be made to FIGS. 3–6 along with FIG. 1. Since the short-term error generating mechanisms (e.g., uncompensated directional gyro drift, integrator nonlinearities, noise effects) which determine the confidence limits in the dead-reckoning system are largely of a random nature, the probability that the actual aircraft position lies elsewhere than in the center of the confidence limits can be expected to follow the normal probability density function, or Gaussian law:

$$\phi(\epsilon) = \frac{e^{-\frac{\epsilon^2}{2}}}{\sqrt{2\pi}}$$

where $\phi(\epsilon)$ = relative probability of an error of value $\epsilon$. The characteristic Gaussian function is illustrated in FIG. 3, where $\phi(\epsilon)$ is normalized to a maximum value of unity; curve 60 represents the Gaussian function at time $t_x$ (FIG. 2) and curve 60' represents the function at times $t_0$ and $t_y$. It will be recognized that the above equation is the expression of a Gaussian distribution which gives probability values for errors going to infinity. For the purpose of this invention, the confidence limits represent finite probability values of the characteristic distribution of the self-contained system, between which it must be assumed that signals from the radio system have possible validity, i.e., the Gaussian distribution is truncated at a small probability value such that there is virtual certainty of true positional data falling therein.

Data from radio system 43 can also be represented by a Gaussian function. In FIG. 4, curve 60 represents the Gaussian function of FIG. 3, and curve 62 represents the error distribution of the radio data at time $t_x$. The indicated distribution of data samples from the radio system result from noise introduced in the transmitter or receiver from internal or extraneous sources. With the centroids of curves 60, 62 superimposed as in FIG. 4, a condition familiar in statistical processes exists where the convolution or product of two distributions results in a joint error distribution (curve 64) which represents a standard deviation, or uncertainty, appreciably smaller than either of distributions 60, 62 alone. This sort of result is achieved by the self-correcting system of this invention, which provides a probability weighted error for the radio data.

The process for obtaining a probability-weighted error by the normal weighting function involves a multiplying operation. FIG. 5 illustrates one-half of the normal density or weighting function 60 for the dead-reckoning system, and a constant slope line 66 represents error magnitude of radio signals $R_r$, which increases from zero at the origin. The product of these two functions, curve 68, represents the probability-weighted error function for various magnitudes of error. The larger the error i.e., the greater the likelihood that the signal represents noise rather than truth, the smaller the weighting; conversely, greater weighting is given signals of small error magnitude, which are more likely to represent true positional data.

FIG. 6 illustrates an arrangement of a data weighting filter to provide probability weighted error for the radio signals $R_r$.

Referring to FIG. 6, weighting filter 50 is shown comprising a pair of amplifiers 70 and 72 each connected to the output of subtraction network 46. Amplifier 70 is a variable gain amplifier provided with delayed-AGC (automatic gain control), as indicated at 74. The outputs of amplifiers 70, 72 are coupled to a subtraction network 76 which is coupled through a switch 78 to integrator 54. Switch 78 is operated by a relay 80 which is actuated by the output of amplifier 72. A timer-gain control 82 for amplifier 72 is controlled by relay 80. Data weighting filter 48 will be understood to be similarly arranged.

Operation of weighting filter 50 will be described with reference to FIG. 6. Radio position signals $R_r$ and dead reckoning position signals $R_t$ are compared in subtraction network 46 to determine the sign and magnitude of the error signal $\epsilon$. The output $E_o$ from variable gain amplifier 70 follows the conventional curve 90 (FIG. 7) of an amplifier having delayed AGC. Amplified error signals $\epsilon_a$ from amplifier 72 increase linearly, as represented by curve 92. The net output of subtraction network 76 is $E_o - \epsilon_a$, indicated by curve 94; such net output increases to a maximum and then decreases with further increases in the amplified error signals $\epsilon_a$. The point at which reduction in gain of amplifier 70 occurs in this connection is determined by the delay threshold established by delay AGC circuit 74. Net output function curve 94 corresponds to the probability-weighted error curve 68 of FIG. 5, as will be readily apparent.

When the amplified error signals increase to a point O where curve 92 intercepts the delayed AGC output curve 90, relay 80 is actuated to open switch 78. This, then, is the point beyond which the error exceeds the confidence limits of the dead-reckoning system 20 (FIG. 1) at that instant. Timer gain control 82, which may be a conventional reversible timing motor driving a potentiometer to control amplifier gain, operates in one direction upon opening of relay 80 to continuously reduce the gain of amplifier 72, whereupon larger error signals ($\epsilon$) will be tolerated before actuation of relay 80 and switch 78. This has the effect of changing the error curve so that it intercepts the output curve 90 at a point X of increased error magnitude; curve 92' represents this situation, and curve 94' represents the corresponding net output function. Points O and X, if widely separated, may correspond to times $t_0$ and $t_x$ in FIG. 2. Thus, weighting filter 50 will accept only signals falling within the confidence limits heretofore mentioned.

When relay 80 is again closed and data within the wider confidence limits is accepted, the timer-gain control 82 rapidly increases the gain of amplifier 72 to a maximum. A reversible timing motor for this purpose preferably would be of the type designed to operate at a predetermined maximum speed in the reverse direction when relay 80 is closed to rapidly set amplifier 72 for maximum gain. Referring again to FIG. 2, this has the effect of narrowing the confidence limits in the short time interval from $t_x$ to $t_y$.

A typical timer gain control 82 is composed of the reversible timing motor and potentiometer and an electronic switch. The electronic switch is actuated by the output of relay 80. The electronic switch determines whether the motor will be connected to a positive or negative potential thereby determining whether the motor will turn in the forward or reverse direction. The potentials need not be the same in magnitude. For example, the negative potential may be 10 volts whereas the positive potential is 28 volts. The motor turns at a speed proportional to the magnitude of the voltage in a direction corresponding to the positive or negative polarity of the potential applied to the motor. The motor operates the potentiometer to vary the gain of the amplifier 72. Stops at either end of the potentiometer are provided in the normal manner so that when the motor has been driven in one direction to the maximum, either the output shaft of the motor is provided with a clutch which slips at the maximum point in either direction, or the stops actuate a switch which disconnects the positive or negative potential from the motor. It is also possible to have the output of relay 80 mechanical and thereby mechanically switch the input to the motor driving the potentiometer.

To achieve the desired results, the signals applied to the data weighting filters preferably are in A.-C. form; they are preferably in carrier form, of a desired frequency, in which signal associated with each magnitude is expressed by the phase of the carrier. In this manner, perfect symmetry with respect to positive or negative errors is assured, and the weighting filters will treat positive and negative errors of equal magnitude identically.

It was previously mentioned that because double integrator loops were provided in the combined system of FIG. 1, noise or random errors falling within the confidence limits will have little effect on the system, and the system will continue to operate satisfactorily in the absence of radio data. To aid in explaining this feature, reference will be made to FIGS. 8, 9 wherein simplified double integrator loops are illustrated. FIG. 8 shows a basic double integrator loop similar to that employed in automatic range-tracking systems of fire-control radars; prime numbers are used to indicate parts corresponding to those in FIG. 1. The input signal $R_r$ form the radio system is compared with the current value of the tracking loop output $R_t$ in subtraction network 46'. Any difference between $R_r$ and $R_t$ is integrated until the agreement is achieved, which is the only equilibrium condition for such a loop. Recognizing that the value $R_t$ is the output of integrator 54', the input to such integrator must be the first time-derivative of range, or velocity, $\dot{R}_t$. The input to the first integrator 32' must similarly be $\ddot{R}_t$, or the acceleration of the variable. Accordingly, if no acceleration exists, the double integrator tracking loop will continuously predict the value of the variable without error.

FIG. 9 illustrates the double integrating loop modified for the separate measurement of velocity $\dot{R}$, which is set into additive network 26' along with the output of integrator 32'. If the velocity $\dot{R}$ were equal to the value of $R_t$ necessary to permit accurate position prediction, the value of $\ddot{R}_t$ and $\Delta \dot{R}$ would be zero. However, since the radio data will vary with ground speed, $\Delta R$ will assume a value which is the difference between the air-derived velocity and ground speed, i.e., $\Delta \dot{R}$ will be equal to the wind magnitude. If there are errors in the calibration of the velocity transducer, the value of $\Delta \dot{R}$ will also reflect this. Thus, the corrections which are added to the local measurements in the aircraft can be seen to represent wind effects as well as other error generating deficiencies; such performance is prerequisite in such a system in order that the equilibrium condition of long-term agreement between $R_t$ and $R_r$ be achieved.

Preferably, the integrators employed are of the electromechanical type such as may involve rate or tachometer feedback from a servo motor output to compare with the input to insure proportionality of integration, and wherein the motor is adapted to drive a precision potentiometer (not shown) to accumulate the integral. Such integrators have accurate long time memory, which is of importance in accurately interpolating through intervals without radio data. Another important significance of the integrator in this application affects the statistics of the noise and the signal. Given a radio data distribution as shown in curve 62 of FIG. 4, individual data samples might have any value with the probability shown. A wide distribution is indicative of a poor signal-to-noise ratio wherein a noise sample is more likely than a valid data sample. However, since the normal probability distribution is symmetrical about the true value of the function, and since in a properly designed system noise will have no preferred value or sign, in a statistically large sample the noise components tend to integrate toward zero. The valid signal component, however, is not random in value, but has constancy; therefore, an integrator with a long time-constant will tend to reject noise and to give accumulative emphasis to valid data. In other words, there must be constancy of input signals before such an integrator will assimilate them and effect a corresponding integration. Thus, since only the desired signals within the confidence limits would exhibit the necessary constancy, these would be the only effects integrated. Also, it should be noted that long-time integration of the total input signal is continuously effected by the two integrators in each loop.

In the absence of signals from radio system 43, such as may be occasioned by temporary interruption of its power supply, the motor shaft positions of the various integrators would remain the same, i.e., they represent memory of the last correction made. Under such circumstances, the dead-reckoning system 20 will not be supplied with improper correction signals, but the last correction "learned" will be retained. Meanwhile, the confidence limits will widen as previously described, with the result that upon restoration of signals from radio system 43, the data weighting filters 48, 50 are conditioned to accept signals within the wider confidence limits.

It should be noted that since a double integrator loop in effect contains two cascaded integrators, combined phase shifting properties of the integrators tend to bring about a condition of instability, i.e., each integrator may shift the phase of the signals substantially 90° so that the combined phase shifts may result in an oscillatory condition. Accordingly, phase correction networks 56, 58 (FIG. 1) are placed in the respective loops to provide stability in this connection.

From the foregoing, it will be apparent that the outputs of coordinate converter 38 will provide reliable present position information. Since each data weighting filter effectively rejects all signals outside the confidence limits, and since the integrators in each loop render the system insensitive to noise and random interference but responsive only to the desired intelligence signals from radio system 43, the effects of the numerous deficiencies aforementioned are greatly minimized, and the signals representing present position are continuously assimilated and provided in the output of the coordinate converter 38.

Prospects for intentional jamming of the self-correction system of this invention are substantially negligible. The reasons are that effective jamming would require that the aircraft be accurately tracked, that the position of the aircraft relative to its coordinate reference be accurately computed, that the location of the coordinate origin used by the radio system be precisely known, and that the radio data encoding technique and transmission method be exactly duplicated in order to transmit unidirectionally increasing position errors to the aircraft. It will be apparent that so long as countermeasures do not saturate the receiver of radio system 43, the data weighting filter arrangement will permit signals many decibels below the interference level to be abstracted. However, assuming sufficient power were employed to saturate the receiver of radio system 43, the self-correcting system of this invention will not permit erroneous data to be accepted, for the reasons previously explained, but dead-reckoning will continue with full memory of the last corrections applied before interruption.

The method of achieving self-correcting automatic navigation with the system of this invention is a cross-correlation technique, and is effective to cause the two sets of data to converge where the centroids are not initially superimposed. The cross-correlation function ($\phi_{12}$) is generally written:

$$\phi_{12} = \lim_{T \to \infty} \frac{1}{2T} \int_{-T}^{T} f_1(t) \cdot f_2(t+\tau) dt \qquad (2)$$

and the value $\phi_{12}$ is usually explored for the variable time-offset ($\tau$) between the two data sets. For this invention, the cross correlation aspect will become more apparent if R (distance) is substituted for $t$ (time) and $\Delta R$ substituted for the time increment $\tau$; this can be done since, at least in the first order, R varies with $t$. Then $$\phi_{12} = \lim_{T \to \infty} \frac{1}{2T} \int_{-T}^{T} f_1(R) \cdot f_2(R+\Delta R) dR \qquad (3)$$

If one terms $f_1(R)$ the external data with its distribution and $f_2(R)$ the best position data presently available in the aircraft (the dead-reckoning system corrected as previously described), with its Gaussian distribution of current confidence-limit-width as previously discussed, the graphic example shown in FIG. 10 can be used to illustrate cross-correlation. FIG. 10 shows the centroid $f_2(R)$ of the position data indicated in the aircraft, as not coincident with the centroid of the externally referenced data. However, the distribution due to confidence limits about $f_2(R)$ includes a finite probability of $f_1(R)$ being the true aircraft position. Furthermore, the product of these two curves, approximated by the dashed curve 100, shows the statistical weighting of data delivered to the integrators such as will tend to move $f_2(R)$ toward $f_1(R)$. In operation, it is the integration of this effect which causes the two sets of data to converge, i.e., to superimpose centroids, over the long interval. Therefore, in broadest language, the system of this invention continuously seeks to maximize the cross-correlation function (i.e., converging two sets of data) by learning the proper value to add into the system as a corrective value.

To further aid in understanding the cross-correlation, it should be noted that in taking the difference between the signals from the dead-reckoning system 20 and radio system 43 as previously explained, the presently indicated error thus derived is related to a set of coordinates which moves with the aircraft. Any slowly varying error between the signals from the two systems thereby becomes a virtually stationary value in the moving coordinate system. This means that the signals are processed as though the aircraft were stationary. In this manner it is made possible to take long-term integration of data in a system where the initial data are continually changing.

As previously indicated, a self-correcting automatic navigation system in accordance with this invention is not limited to use with dead-reckoner systems. What is essential is that position information be processed through a closed double integrator loop which includes a data weighting filter. If the self-contained system utilized the same coordinates as the ground-referenced system, coordinate converters would not be necessary. If the self-contained and ground-referenced systems utilize different coordinates, it will be obvious that it will be necessary to employ coordinate converters suitable to transpose the signals to a common coordinate system for processing in accordance with this invention. In this latter connection, the system of this invention is operable with ground-referenced systems other than those using polar coordinates, e.g., hyperbolic, range-range, angle-angle.

From the foregoing, it will be apparent that there has been described a novel self-correcting navigation system wherein a self-contained navigation system is utilized to provide limits for the acceptance of signals from an externally referenced navigation system, and wherein the signals from the self-contained system are brought into agreement with valid position signals from the externally referenced system to establish reliable, accurate position signal indications for an aircraft.

What is claimed is:

1. A data weighting device comprising a linear amplifier and a variable gain amplifier means to apply a signal to both amplifiers, a subtraction network coupled to the output of said amplifiers, an output circuit to receive the output of said subtraction network, switch means coupling said output circuit to said subtraction network, gain control means for said linear amplifier, means to control said switch means coupled to the output of said linear amplifier and to said gain control means, said switch control means being operative when the output of said linear amplifier exceeds a predetermined level to open said switch means and cause said gain control means to increase the gain of said linear amplifier, and said switch control means being operative upon increase in the gain of said linear amplifier to close said switch.

2. A weighting device comprising a variable gain amplifier with delayed automatic gain control, a linear amplifier, a relay coupled to the output of said linear amplifier, a reversible motor device for controlling the gain of said linear amplifier being coupled to said relay device, a subtraction network coupled to both of said amplifiers, an output circuit to receive the output of said subtraction network, a switch for connecting said output circuit to said subtraction network, said switch being operable by said relay device to connect or disconnect said output circuit to the subtraction network in accordance with the output of the linear amplifier, and said motor device operating to rapidly increase the gain of said linear amplifier in one condition of said relay device.

References Cited in the file of this patent

UNITED STATES PATENTS

| | | |
|---|---|---|
| 2,548,278 | Wirkler | Apr. 10, 1951 |
| 2,613,071 | Hansel | Oct. 7, 1952 |
| 2,643,819 | Lee et al. | June 30, 1953 |
| 2,652,979 | Chance | Sept. 22, 1953 |
| 2,664,243 | Hurwitz | Dec. 29, 1953 |
| 2,676,206 | Bennett et al. | Apr. 20, 1954 |
| 2,692,333 | Holmes | Oct. 19, 1954 |
| 2,715,995 | Wirkler | Aug. 23, 1955 |
| 2,832,886 | Morrill | Apr. 29, 1958 |